US008942466B2

(12) United States Patent
Petre et al.

(10) Patent No.: US 8,942,466 B2
(45) Date of Patent: Jan. 27, 2015

(54) SENSORY INPUT PROCESSING APPARATUS AND METHODS

(75) Inventors: Csaba Petre, San Diego, CA (US); Sach Hansen Sokol, La Jolla, CA (US); Filip Lukasz Piekniewski, San Diego, CA (US); Botond Szatmary, San Diego, CA (US); Eugene M. Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 696 days.

(21) Appl. No.: 13/152,119

(22) Filed: Jun. 2, 2011

(65) Prior Publication Data

US 2014/0064609 A1 Mar. 6, 2014

(51) Int. Cl.
*G06K 9/36* (2006.01)
*H04N 7/24* (2011.01)
(Continued)

(52) U.S. Cl.
CPC ............. *G06K 9/6232* (2013.01); *G06N 3/049* (2013.01); *G06K 9/4628* (2013.01)
USPC .. 382/159; 382/232; 375/E7.001; 375/E7.026

(58) Field of Classification Search
USPC .......... 382/159, 232, 314; 348/571, 663, 665, 348/667, 668, 669, 607, 618, 620, 619, 30, 348/55, 84, 89, 714, 715, 700, E5.001, 348/E5.062, E5.077, E5.065, 670, 441, 348/446, 448, 450, 451; 375/E7.001, 375/E7.026, E7.211, E7.126, E7.132, 375/E7.146, E7.148, E7.224, E7.094, 375/E7.093; 345/89, 30, 55, 84, 87
See application file for complete search history.

(56) References Cited

U.S. PATENT DOCUMENTS 5,138,447 A * 8/1992 Shen et al. ............... 375/240.12
5,272,535 A * 12/1993 Elabd ............................ 348/314
(Continued)

FOREIGN PATENT DOCUMENTS

JP 4087423 3/1992

OTHER PUBLICATIONS

Zarandy et al. "Bi-i: A Standalone Ultra High Speed Cellular Vision System:" In: [online]. Dated Jun. 13, 2005. Retrieved on Aug. 16, 2012. Retrieved from the Internet at URL:<http://ieeexplore.ieee.org/xpl/login.jsp?tp=&arnumber=1438738&url=http%3A%2Fieeexplore.ieee.org%2Fxpls%2Fabs_all.jsp%Farnumber%3D1438738>.

(Continued)

*Primary Examiner* — Sheela Chawan
(74) *Attorney, Agent, or Firm* — Gazdzinski & Associates, PC

(57) ABSTRACT

Sensory input processing apparatus and methods useful for adaptive encoding and decoding of features. In one embodiment, the apparatus receives an input frame having a representation of the object feature, generates a sequence of sub-frames that are displaced from one another (and correspond to different areas within the frame), and encodes the sub-frame sequence into groups of pulses. The patterns of pulses are directed via transmission channels to detection apparatus configured to generate an output pulse upon detecting a predetermined pattern within received groups of pulses that is associated with the feature. Upon detecting a particular pattern, the detection apparatus provides feedback to the displacement module in order to optimize sub-frame displacement for detecting the feature of interest. In another embodiment, the detections apparatus elevates its sensitivity (and/or channel characteristics) to that particular pulse pattern when processing subsequent pulse group inputs, thereby increasing the likelihood of feature detection.

21 Claims, 5 Drawing Sheets

(51) Int. Cl.
*H04N 7/26* (2006.01)
*G06K 9/62* (2006.01)
*G06N 3/04* (2006.01)
*G06K 9/46* (2006.01)

(56) References Cited

U.S. PATENT DOCUMENTS

| | | | |
|---|---|---|---|
| 5,355,435 A | 10/1994 | Deyong et al. | |
| 5,638,359 A | 6/1997 | Peltola et al. | |
| 6,418,424 B1 | 7/2002 | Hoffberg et al. | |
| 6,458,157 B1 | 10/2002 | Suaning | |
| 6,545,705 B1 | 4/2003 | Sigel et al. | |
| 6,546,291 B2 | 4/2003 | Merfeld et al. | |
| 6,625,317 B1* | 9/2003 | Gaffin et al. | 382/209 |
| 7,580,907 B1 | 8/2009 | Rhodes | |
| 7,639,886 B1 | 12/2009 | Rastogi | |
| 7,653,255 B2* | 1/2010 | Rastogi | 382/251 |
| 7,737,933 B2* | 6/2010 | Yamano et al. | 345/94 |
| 8,000,967 B2* | 8/2011 | Taleb | 704/264 |
| 8,416,847 B2* | 4/2013 | Roman | 375/240 |
| 2002/0038294 A1 | 3/2002 | Matsugu | |
| 2003/0216919 A1 | 11/2003 | Roushar | |
| 2004/0066363 A1 | 4/2004 | Yamano et al. | |
| 2004/0193670 A1 | 9/2004 | Langan et al. | |
| 2005/0036649 A1 | 2/2005 | Yokono et al. | |
| 2005/0271289 A1 | 12/2005 | Rastogi | |
| 2005/0283450 A1 | 12/2005 | Matsugu | |
| 2006/0161218 A1 | 7/2006 | Danilov | |
| 2007/0022068 A1 | 1/2007 | Linsker | |
| 2007/0208678 A1 | 9/2007 | Matsugu | |
| 2009/0287624 A1 | 11/2009 | Rouat et al. | |
| 2010/0086171 A1 | 4/2010 | Lapstun | |
| 2010/0166320 A1 | 7/2010 | Paquier | |
| 2010/0235310 A1 | 9/2010 | Gage et al. | |
| 2010/0299296 A1 | 11/2010 | Modha et al. | |
| 2011/0137843 A1 | 6/2011 | Poon et al. | |
| 2012/0084240 A1 | 4/2012 | Esser et al. | |
| 2012/0303091 A1 | 11/2012 | Izhikevich | |
| 2012/0308076 A1 | 12/2012 | Piekniewski | |
| 2012/0308136 A1* | 12/2012 | Izhikevich | 382/181 |
| 2013/0297539 A1 | 11/2013 | Piekniewski et al. | |
| 2013/0297541 A1 | 11/2013 | Piekniewski et al. | |
| 2013/0297542 A1 | 11/2013 | Piekniewski et al. | |
| 2013/0325766 A1 | 12/2013 | Petre et al. | |
| 2013/0325777 A1 | 12/2013 | Petre et al. | |
| 2014/0012788 A1 | 1/2014 | Piekniewski | |
| 2014/0016858 A1 | 1/2014 | Richert | |
| 2014/0064609 A1 | 3/2014 | Petre et al. | |
| 2014/0122397 A1 | 5/2014 | Richert | |
| 2014/0122398 A1 | 5/2014 | Richert | |
| 2014/0122399 A1 | 5/2014 | Szatmary | |
| 2014/0156574 A1 | 6/2014 | Piekniewski | |

OTHER PUBLICATIONS

Rekeczky et al. "Cellular Multiadaptive Analogic Architecture: A Computational Framework for UAV Applications," In: [online]. Dated May 2004. Retrieved on Aug. 16, 2012, Retrieved from the Internet at URL:<ftp://biblioteca.itam.mx/pub/alfredo/ROBOTICS/optic-flow/CAS2004_UAV.pdf>.

Serrano-Gotarredona et al. "On Real-Time AER 2-D Convolutions Hardware for Neuromorphic Spike-Based Cortical Processing." In: [online]. Dated Jul. 2008. Retrieved on Aug. 16, 2012. Retrieved from the Internet at URL<http://www2.imse-onm.csic.es/~bernabe/tnn08.pdf>.

Citation: Zarandy et al. "Bi-i: A Standalone Ultra High Speed Cellular Vision System." In: [online]. Dated Jun. 13, 2005. Retrieved on Aug. 16, 2012. Retrieved from the Internet at URL:<http://ieeexplore.ieee.org/xpl/login.jsp?tp=&arnumber=1438738&url=http%3A%2Fieeexplore.ieee.org%2Fxpls%2Fabs_all.jsp%Farnumber%3D1438738>.

Berkes and Wiskott. Slow feature analysis yields a rich repertoire of complex cell properties. *Journal of Vision* (2005) vol. 5 (6).

Field, G.; Chichilnisky, E. Information Processing in the Primate Retina: Circuitry and Coding. *Annual Review of Neuroscience*, 2007, 30(1), 1-30.

Fiete, et al. Spike-Time-Dependent Plasticity and Heterosynaptic Competition Organize Networks to Produce Long Scale-Free Sequences of Neural Activity. *Neuron 65*, Feb. 25, 2010, pp. 563-576.

Foldiak, P. Learning invariance from transformation sequences. *Neural Computation*, 1991, 3(2), 194-200.

Gerstner et al. (1996) A neuronal learning rule for sub-millisecond temporal coding. *Nature* vol. 383 (6595) pp. 76-78.

Heinke D., Mavritsaki E. Computational Modeling in Behavioural Neuroscience. *Psychology Press*, 2009.

Hopfield JJ (1995) Pattern recognition computation using action potential timing for stimulus representation. *Nature* 376: 33-36.

Izhikevich E. M. and Hoppensteadt F.C. (2009) Polychronous Wavefront Computations. *International Journal of Bifurcation and Chaos*, 19:1733-1739.

Izhikevich E.M. (2004) Which Model to Use for Cortical Spiking Neurons? *IEEE Transactions on Neural Networks*, 15:1063-1070.

Izhikevich E.M. (2006) Polychronization: Computation With Spikes. *Neural Computation*,18:245-282.

Izhikevich, E.M. (2007) Dynamical Systems in Neuroscience: The Geometry of Excitability and Bursting, *The MIT Press*, 2007.

Janowitz, M.K.; Van Rossum, M.C.W. Excitability changes that complement Hebbian learning. *Network Computation in Neural Systems*, 2006, 17 (1), 31-41.

Khotanzad, Alireza, Classification of invariant image representations using a neural network, IEEE. Transactions on Acoustics, Speech, and Signal Processing vol. 38 No. Jun. 6, 1990 pp. 1028-1038.

Knoblauch, et al. Memory Capacities for Synaptic and Structural Plasticity, *Neural Computation* 2009, pp. 1-45.

Masquelier and Thorpe. Learning to recognize objects using waves of spikes and Spike Timing-Dependent Plasticity. *Neural Networks* (IJCNN), The 2010 International Joint Conference on DOI—10.1109/IJCNN.2010.5596934 (2010) pp. 1-8.

Meister, M. Multineuronal codes in retinal signaling. *Proceedings of the National Academy of sciences*. 1996, 93, 609-614.

Meister, M.; Berry, M.J. The neural code of the retina, *Neuron*. 1999, 22, 435-450.

Oster M., Lichtsteiner P., Delbruck T, Liu S. A Spike-Based Saccadic Recognition System. *ISCAS 2007. IEEE International Symposium on Circuits and Systems*, 2009, pp. 3083-3086.

Rekeczky, et al., "Cellular Multiadaptive Analogic Architecture: A Computational Framework for UAV Applications." May 2004.

Revow M., Williams C., and Hinton, G.E., 1996, Using Generative Models for Handwritten Digit Recognition, *IEEE Trans. on Pattern Analysis and Machine Intelligence*, 18, No. 6, Jun. 1996.

Sanchez, Efficient Simulation Scheme for Spiking Neural Networks, *Doctoral Thesis, Universita di Granada* Mar. 28, 2008, pp. 1-104.

Schenunel, J., at al. Implementing synaptic plasticity in a VLSI spiking neural network model, Proceedings of the 2006 International Joint Conference on Neural Networks, Jul. 2006 pp. 1-6.

Schnitzer, M.J.; Meister, M.; Multineuronal Firing Patterns in the Signal from Eye to Brain. *Neuron*, 2003, 37, 499-511.

Serrano-Gotarredona, at al, "On Real-Time: AER 2-D Convolutions Hardware for Neuromorphic Spike-based Cortical Processing", Jul. 2008.

Sjostrom J., W. Gerstner. Spike-Timing Dependent Plasticity. *Scholarpedia*, [Online], 2010, 5(2), 1362.

Szatmary B. and Izhikevich E. M. (2010) Spike-Timing Theory of Working Memory. *PLoS Computational Biology*, 6(8): e1000879.

Thomas S. and Riesenhuber, M, 2004, Realistic Modeling of Simple and Complex Cell Tuning in the HMAX Model, and Implications for Invariant Object Recognition in Cortex, *AI Memo* 2004-017 Jul. 2004.

Thorpe S.; Ultra-Rapid Scene Categorization with a Wave of Spikes. In H.H. Bulthoff et al. (eds.), *Biologically Motivated Computer Vision, Lecture Notes in Computer Science*, 2002, 2525, pp. 1-15, Springer-Verlag, Berlin.

Thorpe, S.J., Delorme, A. & VanRullen, R. (2001). Spike-based strategies for rapid processing. *Neural Networks* 14, pp. 715-725.

(56) References Cited

OTHER PUBLICATIONS

Thorpe, S.J., Guyonneau, R., Guilbaud, N., Allegraud, J-M. & VanRullen, R. (2004). SpikeNet: real-time visual processing with one spike per neuron. *Neurocomputing*, 58-60, pp. 857-864.

Tim Gollisch* and Markus Meister (2008) Rapid Neural Coding in the Retina with Relative Spike Latencies. *Science* 319:1108-1111.

Van Wien R.; Thorpe, S. Rate Coding versus temporal order coding; What the Retinal ganglion cells tell the visual cortex. *Neural computation*, 2001, 13, 1255-1283.

VanRullen, R. & Koch, C. (2003). Is perception discrete or continuous? *Trends in Cognitive Sciences* 7(5), pp. 207-213.

VanRullen, R., Guyonneau, R. & Thorpe, S.J. (2005). Spike times make sense. *Trends in Neurosciences* 28(1).

Wallis, G.; Rolls, E. T. A model of invariant object recognition in the visual system. *Progress in Neurobiology*. 1997, 51, 167-194.

Wiskott, L.; Sejnowski, T.J. Slow feature analysis: Unsupervised learning of invariances. *Neural Computation*, 2002, 14, (4), 715-770.

Zarandy, et al., "Bi-i: A Standalone Ultra High Speed Cellular Vision System", Jun. 2005.

* cited by examiner

SENSORY INPUT PROCESSING APPARATUS AND METHODS

CROSS-REFERENCE TO RELATED APPLICATIONS

This application is related to co-owned U.S. provisional patent application No. 61/318,191, filed Mar. 26, 2010 and entitled "APPARATUS AND METHOD FOR PULSE-CODE INVARIANT OBJECT RECOGNITION", U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010 and entitled "Invariant Pulse Latency Coding Systems and Methods", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,105 filed contemporaneously herewith on Jun. 2, 2011, and entitled "APPARATUS AND METHODS FOR TEMPORALLY PROXIMATE OBJECT RECOGNITION", and U.S. patent application Ser. No. 13/152,084 filed contemporaneously herewith on Jun. 2, 2011 and entitled "APPARATUS AND METHODS FOR PULSE-CODE INVARIANT OBJECT RECOGNITION", each of the foregoing incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to object recognition and identification in a computerized processing system, and more particularly in one exemplary aspect to apparatus and methods of adaptive encoding of sensory input.

2. Description of Related Art

Object recognition in computer vision is the task of finding a given object in an image or video sequence. It is often desired to recognize objects (or object features, such as edges, intersection of edges, etc.) invariantly with respect to object parameters, such as position, size, or orientation. Typically, the object detection task is decomposed into several hierarchical steps, beginning with pre-processing of some basic features of objects in the image, and subsequent processing of increasingly complex features in each successive layer of the hierarchy. Some of the existing approaches to object recognition attempt to mimic the operation of biological neurons by implementing learning and adaptation of synaptic weights in networks of neurons. In other models, neurons are configured to receive visual input and have local mutual inhibition, meaning the firing of one neuron decreases the probability of firing of neighboring neurons. Other approaches utilize "time-to-first-spike" coding, where information is transmitted in the latency of the first spike of a neuron or a set of neurons (Thorpe S.; Ultra-Rapid Scene Categorization with a Wave of Spikes. In H. H. Bulthoff et al. (eds.), *Biologically Motivated Computer Vision, Lecture Notes in Computer Science,* 2002, 2525, pp 1-15, Springer-Verlag, Berlin.). It has been shown that a network with visual input, mutual inhibition, and time-to-first spike coding can develop orientation-selective receptive fields (Heinke D., Mavritsaki E. Computational Modeling in Behavioural Neuroscience, *Psychology Press,* 2009).

Some of the existing visual recognition systems utilize spikes, saccadic movements, a temporal derivative silicon retina, and a second layer of pattern recognition based on multiple neurons and time-to-first-spike coding (Oster M., Lichtsteiner P., Delbruck T, Liu S. A Spike-Based Saccadic Recognition System, *ISCAS* 2007. *IEEE International Symposium on Circuits and Systems,* 2009, pp. 3083-3086).

However, most existing approaches fail to unify saccadic movements and temporal filtering with learning, specifically spike-timing dependent plasticity. Because the existing systems (such as Oster et. al., referred to supra) do not utilize the statistics of the inputs to evolve the system, the filters for spatial features do not develop appropriate spatial and temporal characteristics for extracting information from further inputs when the input statistics change over time.

Some object recognition techniques rely on a matched filter approach. Under this approach, objects or features of objects are detected by banks of filters, with each filter tuned to a particular object or feature type, size, and/or location. Therefore, the filter produces an output signal when it detects a 'match' in an incoming signal. Matched filter techniques disadvantageously require a multitude of filters, as they must be placed at multiple locations where the object can be present; each location requires filters tuned to different sizes or rotations of the feature or object, thereby further adding to complexity. The matched filter technique further relies on filters that are predetermined and fixed. Because they are predetermined and fixed there must be an over-representation of said filters, taking up resources, in order to address the unknown or estimated statistics of the inputs, especially if those statistics change over time.

Accordingly, there is a salient need for an improved computerized sensory input encoding and recognition solution. Ideally, such improved solution would adapts to the statistics of its inputs, including automatically tuning to the correct feature characteristics that are important for further stages of the object recognition hierarchy by a learning process.

SUMMARY OF THE INVENTION

The present invention satisfies the foregoing needs by providing, inter alia, apparatus and methods for pulse-code sensory input encoding.

In one aspect of the invention, an apparatus configured for processing of sensory input is disclosed. In one embodiment, the apparatus comprises a receiver configured to receive an input data frame comprising a feature, a sampler operably coupled to the receiver, an encoder operably coupled to the sampler and configured to receive and encode the first sub-frame and the second sub-frame into a group of pulses, and a first decoder coupled by a plurality of transmission channels to the encoder and configured to receive the group of pulses and to generate a detection signal. In one variant, and configured to generate a sequence of sub-frames comprising a first sub-frame and a second sub-frame, at least one of the first sub-frame and the second sub-frame comprising at least a portion of the feature.

In another variant, displacement of the second sub-frame relative to the first sub-frame is configured to effect detection of the feature, and at least a portion of the plurality of transmission channels is configurable to be adjusted from a first scheme to a second scheme based at least in part on the detection signal.

In yet another variant, the first scheme comprises a first gain and the second scheme comprises a second gain, the second gain configured to be substantially larger compared to the first gain responsive to the detection signal being generated.

In a further variant, at least one of the plurality of transmission channels is configurable to be adjusted from a third scheme to a fourth scheme responsive to arrival of at least one pulse of the group of pulses at the first decoder via the at least one of the plurality of transmission channels within a first time interval relative to the detection signal, the third scheme comprises a third gain and the fourth scheme comprises a fourth gain, the fourth gain configured to be substantially larger compared to the third gain responsive to the at least one pulse arrival prior to the detection signal.

In yet another variant, the encoding is effected by a bank of spatio-temporal filters; e.g., filters configured to generate a time-filtered sub-frame based at least in part on a comparison of a first pixel of the first sub-frame to a second pixel of the second sub-frame. The time-filtered sub-frame comprises a difference between pixels of the second sub-frame and pixels of the first sub-frame, and is configured to enhance detection of the feature compared to that of the first sub-frame and the second sub-frame, the time-filtered sub-frame is encoded into a pattern of latencies of the group of pulses relative to one another. Information related to the feature is encoded into a pattern of latencies of the group of pulses relative to one another, and the encoder is adapted to apply a logarithmic function to an output of each filter of the bank of spatio-temporal filters to configure pulse latencies within the pattern of latencies.

In another embodiment, the apparatus comprises a receiver configured to receive an input data frame, a sampler operably coupled to the receiver and configured to generate a first sequence of sub-frames comprising a first sub-frame and a second sub-frame, at least one of the first sub-frame and the second sub-frame comprising at least a portion of the input data frame, and an encoder operably coupled to the sampler and configured to receive and encode the first sub-frame and the second sub-frame into a group of pulses, and to transmit the group of pulses via a plurality of transmission channels to at least one decoder.

In one variant, at least the portion of the input data frame comprises an edge, a displacement of the second sub-frame relative to the first sub-frame is configured to effect a detection of the feature by the decoder, and information related to at least the portion of the feature is encoded into a pattern of latencies of the group of pulses relative to one another.

In another variant, the displacement is selected so as to enhance detection of the feature based at least in part on at least the portion of the feature having a first color, the first color being substantially different from a background color of the input data frame, the background color not being a part of at least the portion of the feature.

In another variant, the displacement is configured to enhance detection of the at least the portion of the feature based at least in part on at least the portion of the feature having a first pattern, the first pattern being substantially different than a background pattern of the input data frame, the background pattern not being a part of at least the portion of the feature.

In another embodiment, the apparatus comprises a sensor array comprising a sensing aperture configured to select a portion of a sensing field comprising an object feature, a sampler operably coupled to the sensor array and configured to generate a sequence of frames comprising at least a first frame and a second frame, the first frame corresponding to a reference position of the sensing aperture and a second frame corresponding to a second position of the sensing aperture, at least one of the first frame and the second frame comprising at least a segment of the object feature. An encoder comprising a plurality of spatia-temporal filters configured to encode the first and the second frames into a group of pulses is also included. In one variant, the group of pulses comprise a pattern of latencies of pulses relative to one another. At least one decoder node operably coupled by a plurality of transmission channels to the encoder is also used, and is configured to receive the group of pulses and, based at least in part on the group of pulses, to generate a detection signal, the generation of the detection signal characterized by a likelihood related to detection of the segment of the object feature.

In one variant, at least one of the plurality of transmission channels is configurable to be adjusted responsive to an arrival of at least one pulse of the group of pulses at the decoder node via the at least one of the plurality of transmission channels within a first time interval preceding the detection signal, the detection signal is based at least in part on the group of pulses comprising a predetermined pattern of pulses associated with the feature, and a displacement between the second position and the reference position is configured to optimize the encoding of the first and the second frames into the group of pulses, thereby increasing the likelihood.

In another aspect of the invention a processing apparatus is disclosed. In one embodiment, the apparatus comprises a sampler configured to receive an input data frame and to generate a sequence of sub-frames comprising a first sub-frame and a second sub-frame, at least one of the first sub-frame and the second sub-frame comprising at least a portion of a feature, an encoder operably coupled to the sampler and configured to receive and to encode the first sub-frame and the second sub-frame into a group of pulses, and a first decoder configured to generate a detection signal responsive least in part to receiving the group of pulses.

In another aspect of the invention, a method for use in a computerized sensory input processing apparatus is disclosed. In one embodiment, the method comprises selecting a first sub-frame corresponding to a first location within an input frame, the input frame comprising a feature, shifting the first location to a second location, the shifting characterized by a first distance and a first direction, selecting a second sub-frame corresponding to second location within the input frame, encoding the first sub-frame and the second sub-frame into a group of pulses, and transmitting the group of pulses to a decoder via a plurality of transmission channels.

In one variant, at least one of the first sub-frame and the second sub-frame comprise at least a portion of the feature; the shift is configured to effect a detection of the feature, and information related to a spatial characteristic of the feature is encoded into a pattern of latencies of the group of pulses relative to one another based at least in part on the shifting.

In another variant, at least one of the plurality of the transmission channels is configured to effect a different time delay to at least one pulse of the group of pulses, the at least one pulse being transmitted via the least one of the plurality of transmission channels, and the detection of the feature comprises generating a detection signal based at least in part on a coincident arrival of at least two pulses at the decoder via the plurality of transmission channels.

In another aspect of the invention, a sensory input processing system is disclosed. In one embodiment, the system comprises a processor configured to execute instructions maintained in a storage medium; the instructions cause the processor to process a signal representative of at least a portion of an image to extract and analyze information in the signal.

Further features of the present invention, its nature and various advantages will be more apparent from the accompanying drawings and the following detailed description.

Figure 1:
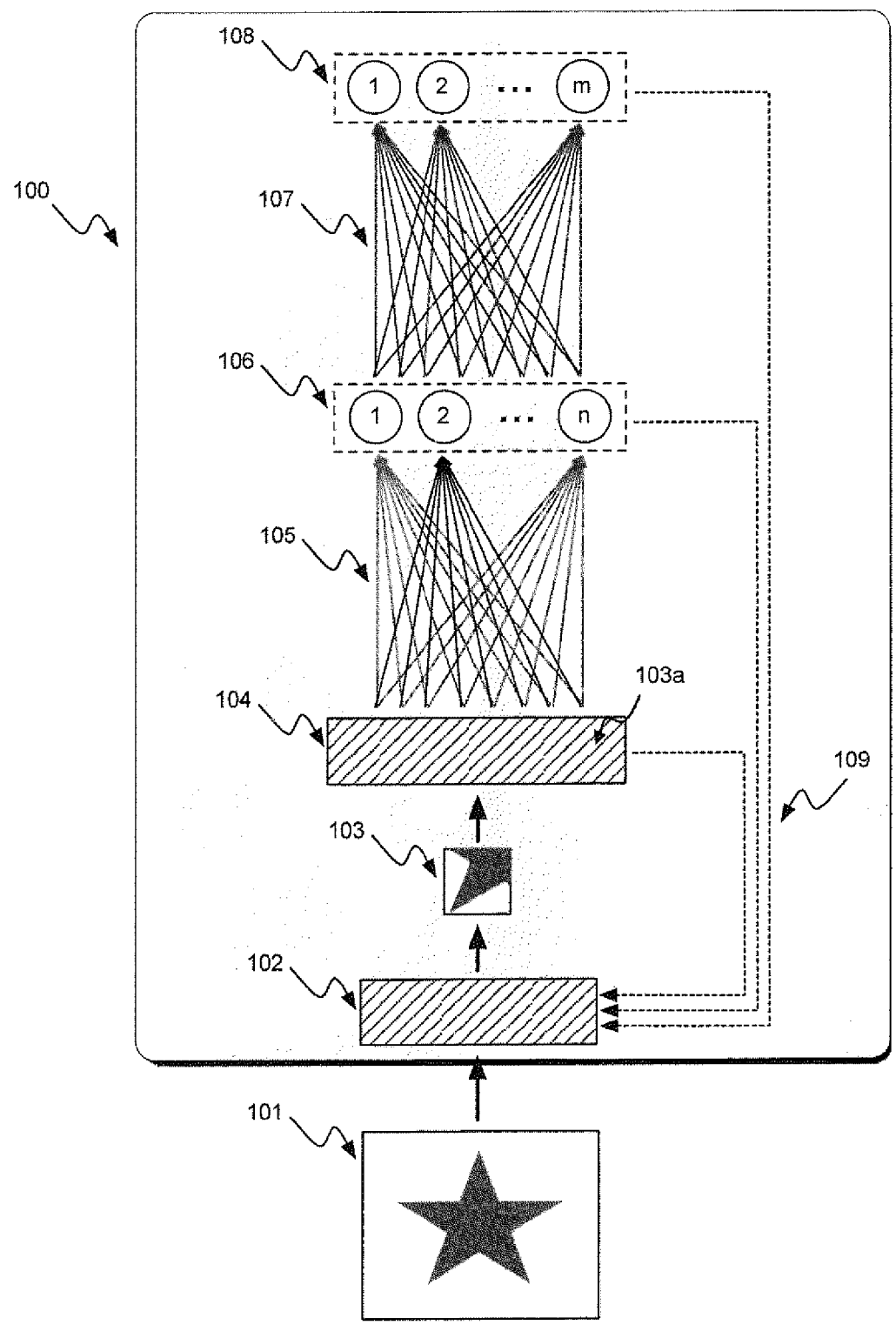
FIG. 1 is a block diagram of image processing apparatus configured according to one embodiment of the invention.

All Figures disclosed herein are ©Copyright 2011 Brain Corporation. All rights reserved.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of or combination with some or all of the described or illustrated elements. Wherever convenient, the same reference numbers will be used throughout the drawings to refer to same or like parts.

Where certain elements of these embodiments can be partially or fully implemented using known components, only those portions of such known components that are necessary for an understanding of the present invention will be described, and detailed descriptions of other portions of such known components will be omitted so as not to obscure the invention.

In the present specification, an embodiment showing a singular component should not be considered limiting; rather, the invention is intended to encompass other embodiments including a plurality of the same component, and vice-versa, unless explicitly stated otherwise herein. Further, the present invention encompasses present and future known equivalents to the components referred to herein by way of illustration.

As used herein, the terms "computer", "computing device", and "computerized device", include, but are not limited to, mainframe computers, workstations, servers, personal computers (PCs) and minicomputers, whether desktop, laptop, or otherwise, personal digital assistants (PDAs), handheld computers, embedded computers, programmable logic devices, digital signal processor systems, personal communicators, tablet computers, portable navigation aids, J2ME equipped devices, cellular telephones, smartphones, personal integrated communication or entertainment devices, neurocomputers, neuromorphic chips, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "connection", "link", "transmission channel", "delay line", means a causal link between any two or more entities (whether physical (wired or wireless), or logical/virtual), which enables information exchange between the entities.

As used herein, the term "invariant" is meant to refer to, without limitation, the response of a recognition system or its components that is not substantially different when one or more parameters of the incoming signal are varied. For example, the system, or some of its subsystems, may generate a complex pattern of pulses in response to an input signal, and changing parameters of the signal would not change substantially the pattern of pulses, but only affect the time of its generation.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), memrister, and PSRAM.

As used herein, the terms "microprocessor" and "processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "object", "object element", "feature", "object feature", and "image element" are meant generally to include all types of attributes within a sensory input that have one or more characteristics that make it distinguishable from background, including, without limitation, straight or curved edges, conjunction of edges, patterns, changes in texture, luminance, coloration.

As used herein the term "pulse pattern", "pattern of pulses", or "pattern of pulse latencies" is meant generally to denote a set of pulses, arranged (in space and time) in a predictable manner that is recognizable at a predetermined level of statistical significance.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase, or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software representation of a latency or timing of the pulse, and any other pulse or pulse type associated with a pulsed transmission system or mechanism.

As used herein, the terms "pulse latency", "absolute latency", and "latency" are meant generally to refer to, without limitation, a temporal delay or a spatial offset between an event (e.g., the onset of a stimulus, an initial pulse, or just a point in time) and a pulse.

As used herein, the terms "pulse group latency", or "pulse pattern latency" refer to, without limitation, an absolute latency of a group (pattern) of pulses that is expressed as a latency of the earliest pulse within the group.

As used herein, the term "relative pulse latencies" refers to, without limitation, a latency pattern or distribution within a group (or pattern) of pulses that is referenced with respect to the pulse group latency.

As used herein, the term "spike-timing dependent plasticity" or STDP is meant generally to denote, without limitation, an activity-dependent learning rule where the precise timing of inputs and output activity (spikes) determines the rate of change of connection weights.

As used herein, the term "pulse-code" is meant generally to denote, without limitation, information encoding into a patterns of pulses (or pulse latencies) along a single pulsed channel or relative pulse latencies along multiple channels.

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, CDPD, satellite systems such as GPS, millimeter wave or microwave systems, optical, acoustic, and infrared (i.e., IrDA).

Overview

The present invention provides, in one salient aspect, apparatus and methods for encoding sensory input for the purposes of detecting and recognizing features within the sensory input. In one embodiment, the apparatus and methods induce movement of the input image data in order to facilitate encoding of the input into a pattern of pulses, as described in detail below.

In one approach, the processing apparatus encodes features in a visual input by shifting the sensor aperture (such as a CCD or CMOS camera) with respect to the visual field of interest in order to induce relative motion between the feature and the sensor elements. Aperture movement induces a displacement of a feature of interest that is positioned within the sensor field of view.

In another approach useful for processing of previously acquired images, the image processing apparatus increases the likelihood of feature detection by shifting an acquired image frame to generate two sub-frames, and subsequently encoding the two sub-frames into a pulse coded output using banks of spatio-temporal filters. Frame displacement is configured consistent with a spatial parameter of the filter, thereby effecting a more optimal encoding regime.

Temporally filtered sub-frame sequence is subsequently processed using banks of spatial filters. In one variant, the spatial filters comprise a contrast-enhancing response, and are configured consistent with the sub-frame displacement.

Generally, frame shift in a particular direction reveals features within the frame of all orientation except those that are aligned with the shift direction. For example, a horizontal displacement reveals vertical features, while vertical shift enhances horizontal features.

The use of a dynamically configurable encoder that adapts to the statistics of the input signal advantageously enables component reuse, and produces a solution requiring fewer components, thereby lowering the overall complexity and cost of the sensory input processing system.

The processing apparatus in the exemplary embodiment comprises an encoder configured to encode filtered sub-frames into groups of pulses that are transmitted to banks of decoders via multiple transmission channels. Each decoder is configured to generate a detection signal upon recognizing a predetermined representation of the object in the received pulse group.

In another aspect of the invention, the frame displacement is combined with the activity-dependent learning to produce a more effective mechanism for learned feature detection. Specifically, learning logic is configured to adaptively adjust channel gain and decoder parameters based on the prior activity of the processing apparatus (for example to received inputs or produced outputs).

The use of pulse timing dependent plasticity, where subsequent dynamics of decoders and/or transmission channels is determined based in part on a prior activity and/or prior signal input, enables the decoder apparatus to adapt its configuration (learn) and to develop recognition properties through learning and adaptation that can be selective and/or invariant.

DETAILED DESCRIPTION OF EXEMPLARY EMBODIMENTS

Detailed descriptions of the various embodiments and variants of the sensory input processing apparatus and methods of the invention are now provided. In one approach, the sensory input is used to describe a visual scene (for example a composition of objects and object features) that produces a visual input (such as a digital image in a charge-coupled device (CCD) or complementary metal-oxide-semiconductor (CMOS) active pixel sensor device, or the sensory output of a retina). However, other forms of sensory input that are arranged spatially and/or temporally are equally applicable to the invention, including e.g., somatosensory input or auditory input with a temporal signal and spatial distribution. Embodiments of the invention may also be used for processing of signals of other, often non-visual modalities, including various bands of electromagnetic waves (e.g., microwave, x-ray, infrared, etc.) and pressure (e.g., sound, seismic, tactile) signals.

The invention may be for example deployed in a hardware and/or software implementation of a computer-vision system, provided in one or more of a prosthetic device, robotic apparatus, and other electromechanical device requiring object recognition functionality. In one such implementation, an image processing system may include a processor embodied in an application specific integrated circuit ("ASIC"), which can be adapted or configured for use in an embedded application such as a prosthetic device.

Apparatus

Referring now to FIG. 1 exemplary embodiment of the sensory input encoding apparatus of the invention is described. The apparatus 100 is configured to process input signals, comprising a sequence of two-dimensional data frames acquired by a sensing apparatus. The input signal may be, for example, an image received from an image sensor (such as a CCD or a CMOS sensor device), or downloaded from a file, such as a stream of two-dimensional matrices of red green blue RGB values (e.g., refreshed at a 24 Hz or other suitable frame rate). It will be appreciated by those skilled in the art that the above image parameters are merely exemplary, and many other image representations (e.g., bitmap, luminance-chrominance (YUV, YCbCr), cyan-magenta-yellow and key (CMYK), grayscale, etc.) are equally applicable to and useful with the present invention. Furthermore, data frames corresponding to other (non visual) signal modalities such as sonograms, radar or tomography images are equally compatible with the embodiment of FIG. 1.

The apparatus 100 is configured to receive an image frame (such as a digital video or a radar image) 101. As discussed above, the image frame may be received from an appropriate sensor, or downloaded from a file, or obtained from yet another source. A sampling apparatus 102 receives the input frame 101 and selects a first sub-frame, also referred to as the reference sub-frame, which is forwarded to the encoder 104.

The sampling apparatus 102 further sub-samples the input image 101 and generates a second sub-frame 103 and forwards it to the encoder 104 as shown in FIG. 1. In one variant, the reference sub-frame (that was transmitted to the encoder prior to the arrival of the sub-frame 103) is stored in the encoder storage apparatus. In another variant, the reference sub-frames is buffered at the sampling apparatus 102, and subsequently both sub-frames (the reference sub-frame and 103) are transferred to the encoder 104. As those skilled in the arts will recognize, a multitude of buffering and/or frame transfer implementations may be used consistent with the invention, including without limitation packetized data transmission, serial or parallel transfer, use of buffers, frame partitioning (into, for example, rows and columns), multiplexed transmission (where respective frame portions, e.g., a first row of each frame 103 are transmitted together, etc.). In a different implementation, the sampling apparatus 102 generates and transmits both frames in parallel to the encoder 104, for example in a row by row, column-by-column, zigzag, or another predetermined pattern.

In the exemplary embodiment of FIG. 1, the second sub-frame 103 corresponds to a position within the image frame 101 that is shifted by a predetermined distance and direction relative to the previous sub-frame 103. In one implementation, both sub-frames (i.e., 103) have the same dimensions, and the sub-frame shift parameters are controlled by the sampling apparatus 102. The sampling apparatus generates a sequence of sub-frames comprising several shifted sub-frames (not shown) which are generated in a manner that is similar to the approach described above, and forwards the sub-frame sequence to the encoder 104.

In another embodiment, the input image 101 is down-sampled by the sampling apparatus 102. As an aside, it is typically advantageous to reduce the amount of redundant information in sensor processing systems. For example, an input image may comprise a 32-bit 1000×700 pixel bitmap array carried by a 3×10 MB/frame data throughput, which therefore requires a sufficiently high-speed data link between the sampling apparatus and the encoder. Partitioning the input image into a smaller sub-frames (for example 3×3 or 10×10 pixels) and/or down-sampling dramatically reduces the data processing load of the sampling and the encoder apparatus, and advantageously reduces the complexity of data transmission link to the encoder.

In one variant of the invention particularly applicable to visual signal processing, the encoder is analogous to a mammalian retina or a portion of the retina. Similarly, for auditory sensation, the encoder processor performs functions that are typically performed by the cochlea. Likewise, for one implementation compatible with olfaction, the encoder performs (at least a portion of) functions of the olfactory bulb, while in somatosensation applications, the encoder combines functionality typically performed by the sensors in the joints, ligaments, muscles, and skin. The foregoing examples underscore the breadth of potential physiologic applications to which the present invention may be applied.

The encoder 104 of FIG. 1 processes the received sequence of sub-frames 103 and encodes the content within the sub-frames into groups of output pulses that propagate along the transmission channels 105 to the decoders 106 using e.g., any of the mechanisms described below. In one approach, each transmission channel is configured carry different information about the image within the sub-frames. For example, a sub-set of channels carries information related to the left-most star edge in the sub-frame 103, while another channel sub-set carries information related to another edge.

In another approach, the processing apparatus selects an area within the frame (a sub-frame) and shifts the position of the sub-frame within the main image, thus producing a sequence of sub-frames, corresponding to different areas within the image. The subsequently generated image sub-frames, therefore, comprise object elements or features that are shifted throughout the frame sequence.

The apparatus 100 comprises multiple banks and/or layers of decoders (such as decoder banks 106, 108) connected in series (for example using transmission channels 107 in FIG. 1) and/or in parallel. While only two serially linked decoder banks 106, 108 are shown in FIG. 1, more complex topographies comprising any practical number of decoder layers are compatible with the present invention.

Each decoder within the bank 106, as denoted by designators 1 through n in FIG. 1, is coupled to the encoder via multiple groups of transmission channels and is configured to receive pulses propagating through the respective channel group from the relevant encoder. Upon receiving and combining one or more pulses from the encoder, the decoders of the decoder bank 106 perform feature and or object detection using the received input and generate detection signals when appropriate. These detection signals are transmitted to the downstream decoder bank 108 via the transmission channels 107. In the embodiment of FIG. 1, each decoder within the bank 108, as denoted by designators 1 through m, is coupled to a group of decoders within the bank 106 via a respective group of transmission channels 107. Thus, each decoder within the bank 108 is configured to receive pulses propagating through the respective channel group from the upstream decoder bank 106.

In one implementation, a sub-set or all of the transmission channels (e.g., channels 105, 107) are configured to apply a different time delay to the pulses during transmission of the pulse groups to decoders.

It will be recognized by those skilled in the arts that various encoder configurations may be used with the present invention. One exemplary encoder embodiment (such as for example encoder 104 of FIG. 1) are described in a commonly owned and co-pending U.S. patent application No. 61/318, 191 entitled APPARATUS AND METHOD FOR PULSE-CODE INVARIANT OBJECT RECOGNITION incorporated by reference, supra. Specifically, an identity (or type) of each feature is encoded into a pattern of relative pulse latencies (the pulse pattern) and parameters of the feature, such as scale, position, color, transparency, are encoded into the group delay of the pulse pattern, the delay that is common to all pulses within the group. Such an encoding approach advantageously enables feature detection and recognition that is invariant to object parameters such as scale, position, rotation, hence simplifying the sensory input processing apparatus.

In another implementation, also described in detail in the above cited application, each subsequent bank of decoders is configured to receive signals from the previous bank, and to detect a more complex features and objects. For example, a bank of edge decoders is followed by a bank of bar decoders, followed by a bank of corner decoders and so on, thereby enabling e.g., alphabet recognition by the apparatus.

In yet another implementation, also described in detail in the above cited application, the encoder apparatus is configured to encode deviation from one or more optimal stimuli (such as an optimal object position and/or orientation) into latencies of pulsed outputs thereby causing the decoders to respond selectively to, for example, features at an optimal orientation.

In one specific implementation of the sensory input encoding apparatus of the invention, the encoder 104 produces pulse-coded output invariantly with respect to feature luminance and/or contrast.

In another particular implementation of the invention, the pattern of relative pulse latencies is generated upon an occurrence of one or more of a cyclic event, such as a clock signal, an internally generated oscillatory wave, arrival of an input frame, appearance of a new feature in the image and a time related to a previous event.

In another approach, decoder dynamic states and/or channel transmission characteristics are modified. For example, the techniques and apparatus described in a commonly owned and co-pending U.S. patent application Ser. No. 13/152,105 entitled APPARATUS AND METHODS FOR TEMPORALLY PROXIMATE OBJECT RECOGNITION incorporated by reference, supra, may be used consistent with the present invention. This approach combines decoder input activity, detection signal generation, and channel activity to adjust decoder excitability and channel gain (or channel delay).

Similarly, activity-dependent learning mechanisms may be employed in the encoding apparatus 100 to adjust characteristics of transmission channels. In one variant, the channel 105, 107 connection strength (or gain) is changed. In another variant, the channel temporal delay is changed. In yet another variant, decoder excitability of the decoder bank 106, 108 is adjusted by any of a variety of mechanisms, such as e.g., changing detection threshold, amplifying/suppressing input to the decoder, or applying/removing decoder inhibition. Channel and decoder modifications result in changing how the strength and/or timing of the input activity (the pre-synaptic activity) affects the post-synaptic activity of the decoder. In still another variant, the decoder states and/or channel transmission characteristic are adjusted based on a history of input to the encoder. This is in effect a form of learning or plasticity, where the connections between channels and decoders are dynamically adapted during apparatus operation.

In another embodiment of the invention, the encoding apparatus (such as the apparatus 100 in FIG. 1) is configured to encode any of the input imagery data that are in a potential field of view and which can be acquired by a sensing apparatus (such as e.g., a camera sensor, a radio frequency antenna, or an eye, etc.). Consider an exemplary camera (or a radar antenna) that are configured adjust their azimuth within a certain range (for example, 180 degree (deg.) or a 360 deg. arc) thereby allowing acquisition of many views; the full image frame (e.g., the frame 101) corresponds to a full 180 deg, or 360-deg. swath of available views. The information content of these available views is vast, thus necessitating sub-sampling. In this case, the sub-frame corresponds to a portion (e.g., a single snapshot) of the available swath of view(s) that is acquired by the sensing aperture (camera, eye, antenna) at a particular orientation to produce the sub-frame 103.

In one variant, the sampling apparatus 102 of FIG. 1 comprises a portion of mammalian visual system effecting eye movement (for example, the muscles of the eye and eye-movement related areas of the nervous system, such as the superior colliculus and associated brainstem areas). The sampling apparatus 102, therefore, acts so as to move a sensing apparatus (e.g., eye) relative to the input (object). In one implementation of the invention, the sub-frame (for example, the sub-frame 103 of FIG. 1) is sub-sampled by the sampling apparatus 102. Because there is a limit to how much information can be passed at any one time to the encoder 104, the sampling apparatus selects a subset of the input image for further processing.

In another variant, the input (e.g., object) is moved relative to the encoder (such as in visual tracking, visual gesture recognition, or electronic target tracking applications).

In auditory reception, the actions of the sampling apparatus are described as being similar to movements of the head (and therefore the ears) or an acoustic (hydrophone/microphone) array in relation to sound sources. In olfaction, it may be similar to moving the head (and therefore the nose) in relation to chemical gradients of odorants. In somatosensation, it may be similar to moving the body (and therefore the sensors of the joints, ligaments, muscles, and skin) in relation to tactile and other force and pressure stimuli.

Feedback Network

In the exemplary embodiment shown in FIG. 1, encoder and decoder activity is used provide a feedback to the sampling apparatus 102 via the feedback network 109 in order to optimize sampling of subsequent sub-frames (and/or the input frame 100), as described in detail below. The feedback network 109 acts similarly to a closed sensory-motor loop, and provides a positive or negative feedback effect.

In the embodiment of FIG. 1, the feedback network 109 delivers signals from one decoder to other decoders of a previous decoder hierarchy level (e.g., decoder banks 106, 108), relative to the feed-forward path of the information derived from the input image. Such configuration forms a closed sensory-motor loop (FIG. 1), with the channels 109 carrying a positive or negative feedback effect. In one approach, the decoders arc implemented to model neurons. and a positive feedback leads to an excitatory post-synaptic potential in the decoder, moving the decoder dynamic state closer to a detection threshold. In another approach, negative feedback acts as an inhibitory connection, configured to inhibit post-synaptic potential, thereby preventing the decoder from generating the detection signal via any of a variety of mechanisms, such us e.g., delaying or reducing the input signal, or changing the decoder state adjustment as described in the above cited application. In yet another approach, any of the decoders are configured to provide feedback. See, e.g., commonly owned and co-pending U.S. patent application Ser. No. 13/152,105 entitled APPARATUS AND METHODS FOR TEMPORALLY PROXIMATE OBJECT RECOGNITION incorporated by reference, supra for exemplary implementations.

In one configuration, the negative feedback network acts on decoders within the same bank (level), which is referred to herein as "lateral inhibition". A strong negative feedback in this scenario may allow for only a subset (k) of the decoders to respond to particular object or feature at the same time, giving rise to a "k-winner-take-all" (k-WTA) mechanism. The number of winners (k) depends on the decoder network configuration, including the timing of the negative feedback relative to the feedforward signals, the distribution of delays, and decoder dynamics. In one variant, such inhibition mechanism allows only a single decoder to be active at any one time, corresponding to the 1-WTA mechanism.

In another approach, a positive feedback network is configured to act upon the decoders within the same bank (level), and this is referred to as "lateral feedback", providing excitation and/or inhibition information.

In certain embodiments, the output signals from one or more decoders or the encoder (such as spatiotemporal filters) are combined by the feedback network, and delivered via the channels 109 to affect the activity of the sampling apparatus. Such a feedback mechanism effects a closed processing loop, whereby the input is combined with the history and state of the image processing apparatus, thereby affecting processing of the next input presented to the apparatus. Depending on which decoders or filters contribute to the feedback, the feedback signal is used to direct the movements of the movement processor apparatus, such that the subsequent input is driven by salient features in the input or specific objects or features in the input.

In another embodiment, the adjustment mechanism is configured based on the timing-based learning rules and comprises a spike-timing dependent plasticity (STDP), enabling formation of the decoder receptive pattern field. That is, patterns to which the decoder becomes more sensitive based a prior sensory input history. In one variant, the receptive pattern field comprises orientation-selective receptive fields. The features learned and detected by the decoder in this case correspond to orientated edges or bars in the input image. Receptive fields describe sets of weighted inputs from filtered input elements, where the weights are adjusted based on activity.

In yet another embodiment of the invention, the encoding apparatus is configured to process data generated by any compatible sensor technology, including but not limited to, electromagnetic, pressure, gravitational, and chemical, and represent these forms of energy input as a pulse-coded output.

This aspect of the invention represents a powerful dynamic mechanism for adaptive adjustment of the object detection apparatus configuration in response to dynamically varying input. The adaptive feedback enables the sampling apparatus (for example, the apparatus 102 of FIG. 1) to adjust frame displacement parameters (such the displacement vector 214 of FIG. 2) in order to enhance detection (for example, increase the detection likelihood) of certain object features such as e.g., the vertical edge in FIG. 2, and to suppress detection (for example, reduce the detection likelihood) of other features.

Methods

Referring now to FIGS. 2-6, exemplary embodiments of encoding and feature enhancement methods useful with, for example, the encoder apparatus 104 of FIG. 1 described supra, are described.

Movement-Based Encoding Methods

Figure 2:
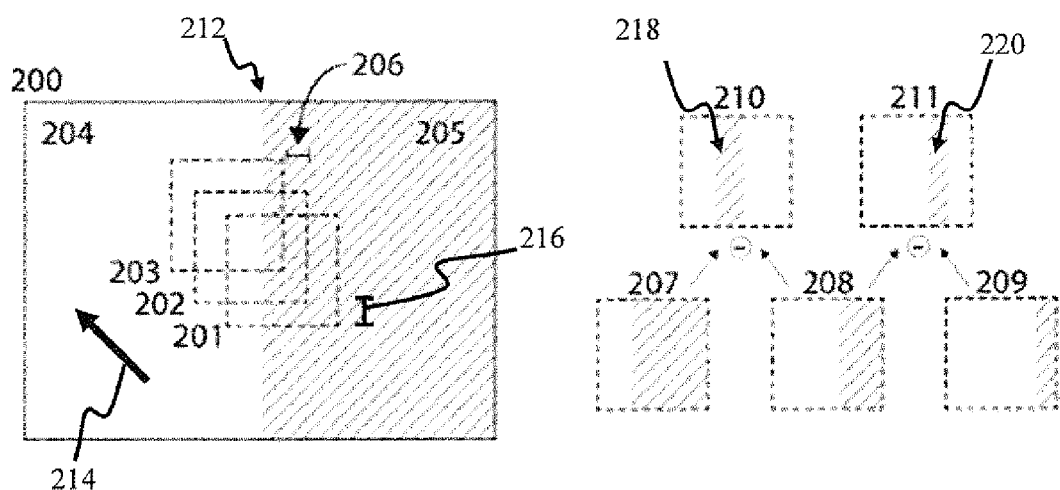
FIG. 2 is a graphical illustration of an image shift mechanism and temporal filter according to one embodiment of the invention.

Referring now to FIG. 2, one exemplary embodiment of the visual frame encoding method, comprising encoding of sensory input frame into a pulse-coded output, is described in detail. The input frame 200 (such as, for example, the frame 101 in FIG. 1) comprises an object feature, such as, for example, the vertical edge 212 formed between a darker 205 and a lighter 204 region of the image 200 in FIG. 2. At first step, a reference sub-frame 207, corresponding to the reference position 201, is generated from the input frame 200. The reference position 201 within the image frame 200 is chosen either at random or according to a selected algorithm.

At next step, the reference position is shifted to the positions 202, 203 within the frame 200 in a direction, determined according to an algorithm, which may also involve feedback from a higher layer. The position shift may be also implemented as a function of a random variable. In the embodiment of FIG. 2, the displacement s depicted by the vector 214.

At next step, a sequence of the shifted image sub-frames 208-209 is generated. During the course of the displacement, each sub-frame is shifted by a distance 206 in the horizontal, and a distance 216 in the vertical.

In one variant, useful in acquiring real time imagery, the input frame corresponds to a multitude of available views (e.g., 180 deg. or 360-deg. swaths as described supra) within the sensing field and the sub-frames 207-209 correspond to successive snapshots taken by the sensing array at time intervals corresponding to the positions 201-203. In this case, the 2-D/3-D sensing array aperture (as depicted by the dashed rectangles 201-203 in FIG. 2) is displaced relative to the input, thus providing new inputs the sensors (such as a block of retinal ganglion cells (RGCs), described in detail below). This displacement may be accomplished by a variety of methods, including physical movement of a sensing array, simulated displacement and sub-sampling of an already acquired input.

In another variant, the object within the sensing field is moved with respect to the sensing aperture, such as for example, in a gesture recognition or target tracking applications.

In yet another variant, the input frame 200 corresponds to an acquired image (stored in memory) and the sub-frames 207-209 correspond to pixels selected from the portions of the image outlined by the dashed rectangles 201-203, which in this case correspond to the 'sensing aperture'. The position displacement here is effected via a plurality of computer instructions executed by a computerized apparatus.

Returning now to FIG. 2, the sensing aperture displacement (as illustrated by the dashed rectangles 201-203 in FIG. 2) shifts pixels within each sub-frame by a distance 206 at each frame, relative to an edge in the input image, thus producing the sub-frames 207-209.

At next step, the sub-frames 207-207 are processed using banks of spatio-temporal filters. As used herein the term ("spatia-temporal" a combination of spatial and temporal filter components, as described in detail below.

In one embodiment, the spatiotemporal filters are modeled as biological retinal ganglion cells (RGCs). As a brief aside, RGCs have particular spatiotemporal characteristics, such as two-dimensional "difference-of-Gaussians" spatial filter profile, and a difference filter in the temporal domain. The centers of the RGCs may be arranged spatially as a two-dimensional (2-D) or a 3-dimensional (3D) structure, such as a linear array, a rectangle, square, or honeycomb pattern. The spatial extents of the RGCs, in terms of the input image pixels, may overlap with multiple neighboring RGCs. Other compatible configurations will be readily recognized by those of ordinary skill given the present disclosure, such as e.g., sparse or '+' shaped arrays.

Figure 3:
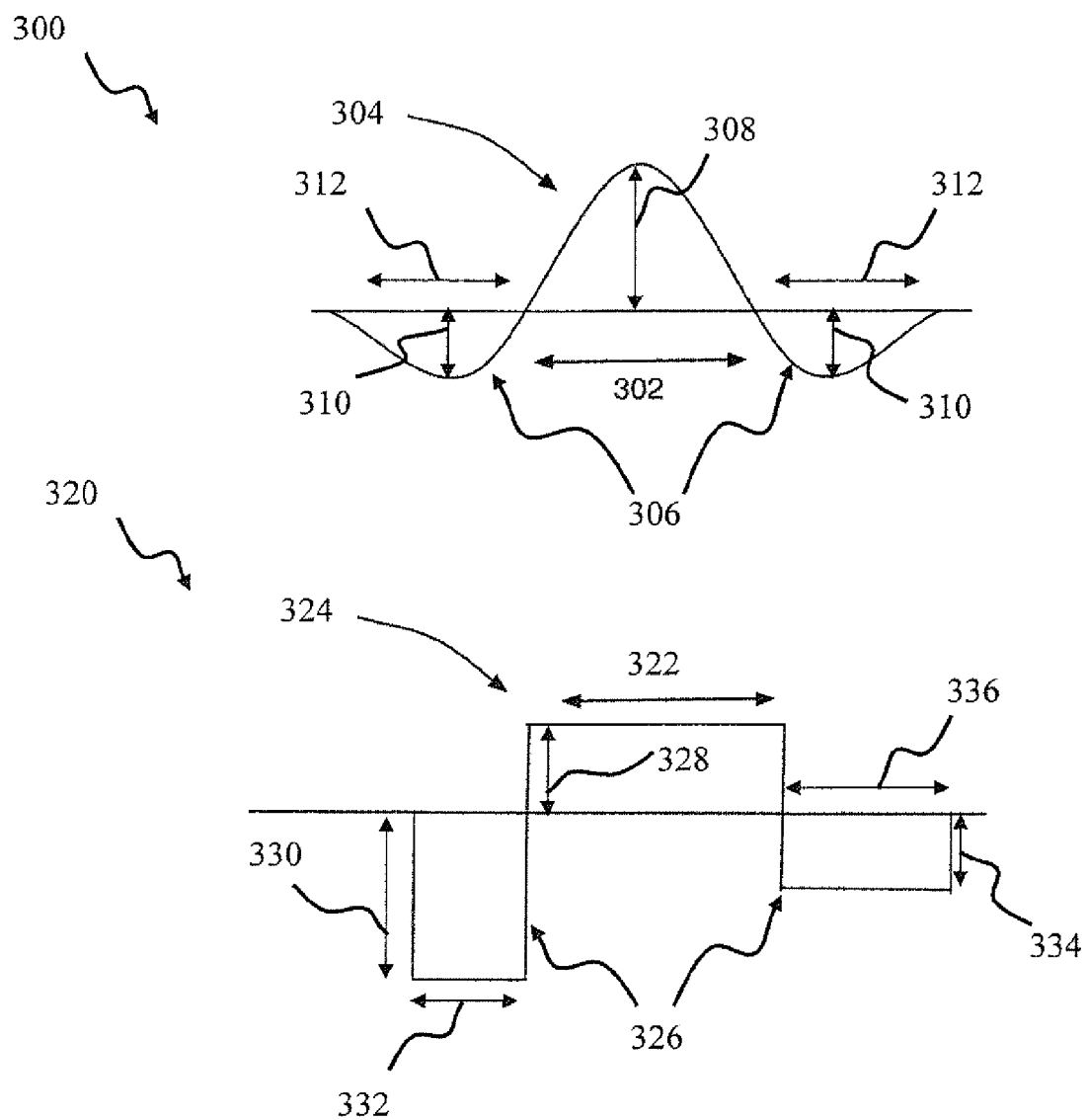
FIG. 3 is a plot of spatial filter response function in accordance one embodiment of the invention.

In one variant, the spatial component of the RGC filter comprises a 3×3 matrix configured as follows in the pixel space:

$$M = \begin{vmatrix} 0 & 0 & 0 \\ 0 & 9 & 0 \\ 0 & 0 & 0 \end{vmatrix} - 1, \quad \text{(Eqn. 1)}$$

thus corresponding to a two-dimensional version of the one-dimensional filter (such as, for example, the filter 320 of FIG. 3).

In another embodiment, the filter bank comprises a set of filters, implementable as software or in hardware components, and applied to different portions (sub-frames) of the input frame.

As shown in FIG. 2, the initial sub-frame 207 and shifted sub-frames 208, 209 all comprise a portion of the object feature (the vertical edge) which occupies different portions of each sub-frame 207-209. In the embodiment of the encoding method illustrated in FIGS. 2-3, the spatio-temporal filters are configured as space-time separable, in which case the filter output is invariant with respect to the order of application of filter components (i.e., the spatial and the temporal). Other filter implementations (for example joint space-time) may be used consistent with the invention as well.

A new sequence of sub-frames $G_i$ is constructed using a running difference between adjacent sub-frames $S_i$ within the sequence (such as the sub-frames 207-209) as follows:

$$G_i = S_{i+1} - S_i. \quad \text{(Eqn. 1)}$$

As shown in FIG. 2, the new sub-frames $G_1$-$G_2$ 210-211 are constructed by differencing successive pairs of the input sub-frames $S_1$-$S_3$ (the sub-frames 207-209). Eqn. 1 describes a recursive running-sum filter of length one. In one variant, the differencing is performed on a pixel-by-pixel basis; that is, a pixel value corresponding to a first location (for example, row 1, column 1 (1,1)) of the $S_i$ sub-frame is subtracted from the respective pixel value at the same location (row 1, column 1) of the $S_{i+1}$ sub-frame.

The temporally filtered sub-frames 210-211 at the output of the temporal filter component, comprise vertical bars 218, 220 that are enhanced versions of the vertical feature (the edge 212). It is appreciated by those skilled in the art that while the vertical sub-frame displacement (the displacement 216) is not relevant for enhancing (and, hence, detecting) the vertical object feature as illustrated in FIG. 2, it is relevant to the horizontal feature detection in a more generalized example wherein the object comprises both horizontal and vertical features, such as, for example, a slanted edge.

At next step, the temporally filtered sub-frame sequence $G_i$ 210-211 may further be filtered using a bank of spatial filters $F_k$. Spatial responses of the exemplary spatial filters compatible and useful with the present invention are shown in FIG. 3. Each spatial filter 300, 320 is constructed to comprise a center portion 304, 324 (also referred to as the main lobe) with a width 302, 322 and a positive gain 308, 328. The center portion 304, 324 in each filter is surrounded by two side portions 306, 326 with negative gains. The overall shape of the filter spatial response (such as that shown in FIG. 3) acts as a contrast enhancer when applied to an image. That is, negative/positive/negative gain sequence is configured to emphasize differences between adjacent pixels within the filtered image. In one approach (exemplified in the first filter 300 in FIG. 3), the side portions are configured symmetrically with equal width 312 and gain 310. In another approach (the second filter 320 of FIG. 3), the side portions are asymmetric with unequal width 332, 336 and gains 330, 334. It is appreciated by those skilled in the art that other filter configurations are useful with the present invention, such as for example a filter with the end sections 326 reversed, or a filter comprising additional sections with alternating positive/negative gains.

In one variant, the spatial profile of the first filter 300 is achieved by a difference of two Gaussian-shaped filters, and is referred to as the "difference of Gaussian" filter. In this variant, in order to control spectral leakage, a positive Gaussian function with a larger width is subtracted from a positive Gaussian function with a smaller width, thus giving rise the three-lobed shape seen in filter 300.

In another variant, the spatial filters (such as the first and second filters 300, 320 of FIG. 3) that are applied to the temporally filtered sub-frames 210, 211 are configured to match the sub-frame displacement. That is, the width of the filter main lobe 302, 322 is configured to match the horizontal distance 206 or the vertical distance 216, or both, in FIG. 2. Such matching converts the edge feature 212 into an optimal stimulus 210, 211 for the filters 300, 320. Alternatively, implementation, the displacement parameters (such as the distance 206, 216) may be configured to match the filter main lobe width.

When the sub-frames 207-209 contains no object portions or features (such as the edge 212), the spatio-temporal filters produce a low output signal for these sub-frame, which in turn affects decoder output at a subsequent step (such as, for example, implemented in the decoder bank 106 of FIG. 1).

It is appreciated by those skilled in the art that spatial and temporal filtering may be carried out in any order if the filters are space-time separable. That is, the total filter response is the product of a spatial filter (function only of space) and a temporal filter (function only of time). Characteristics of the frame movement, such as the direction of movement with respect to feature orientation within the frame, are configured to enhance certain features relative to other features.

Feature Enhancement Methods

Figure 4:
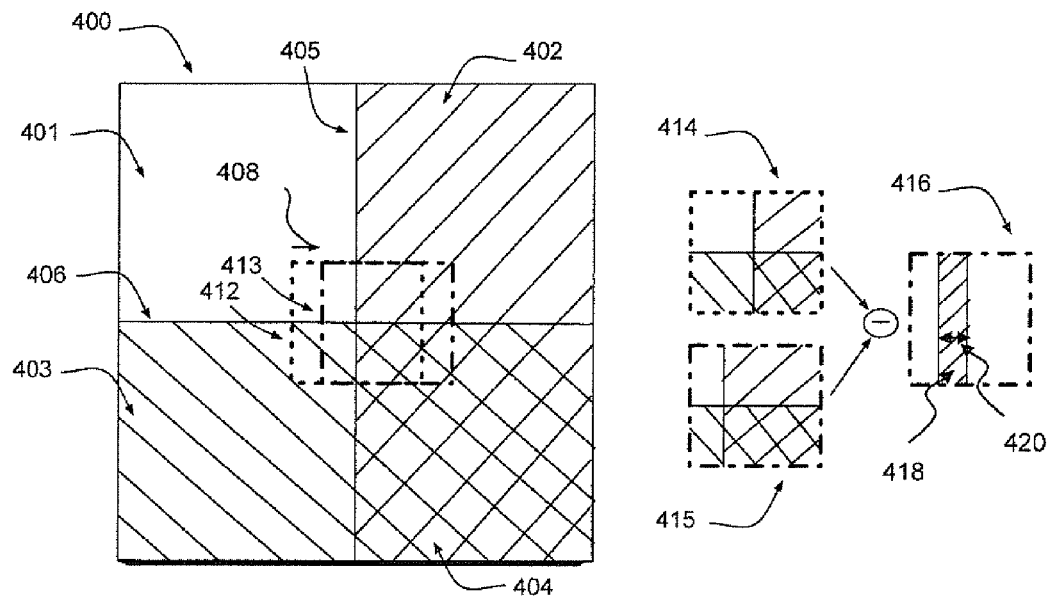
FIG. 4 is a graphical diagram illustrating application of a horizontal frame shift that reveals vertically oriented feature without affecting horizontally oriented features according to one embodiment of the invention.
Figure 5:
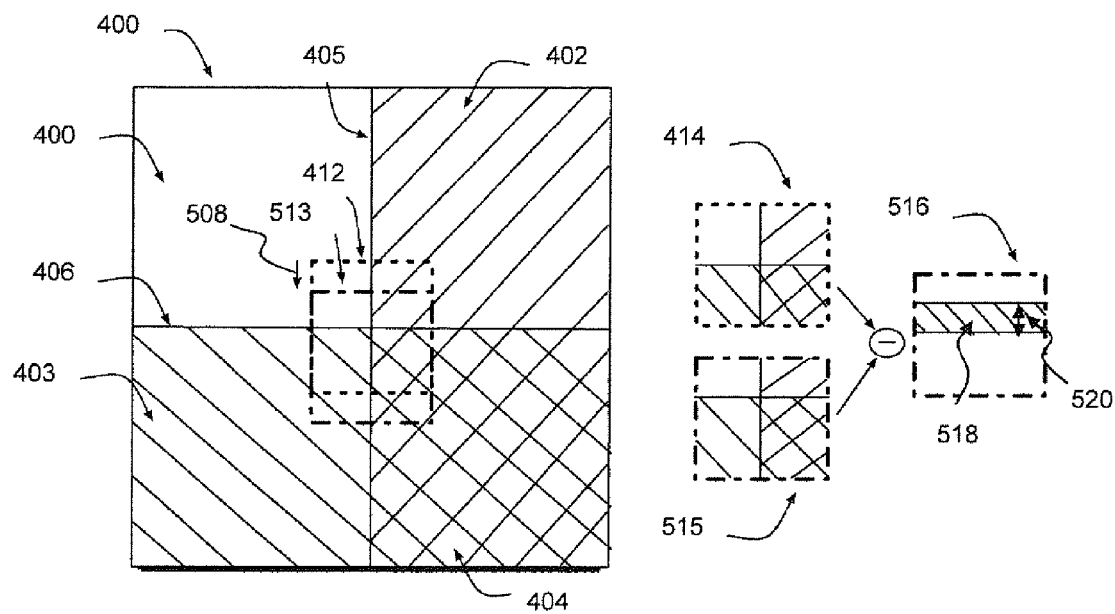
FIG. 5 is a graphical diagram illustrating application of a vertical frame shift that reveals horizontally oriented feature without affecting vertically oriented features according to one embodiment of the invention.

One exemplary feature enhancement embodiment that utilizes spatio-temporal filters and useful for object detection with the present invention is shown and described with respect to FIGS. 4 and 5. The spatio-temporal filter in this embodiment comprises a spatial component (such as the first or second filter 300, 320 of FIG. 3) and a temporal component (such as, for example, according to Eqn. 1). At first step, an input frame (such as the frame 400 in FIGS. 4 and 5) is received by the processing apparatus (e.g., the apparatus 100 of FIG. 1). The image 400 comprises four quadrants 401-404, with each quadrant corresponding to a different image property. In the embodiment of FIG. 4-5, the property corresponds to signal intensity (such as described by a grayscale shade value. By way of example, the quadrants 401-404 correspond to a scaled intensity of 0, 1/3, 2/3, and 1, respectively, where all values are scaled to fall within the range from 0 to 1. Therefore, the quadrants 401-404 form two edges within the frame 400, a vertical edge 405 and a horizontal edge 406, which are considered as the object features being enhanced and detected by the processing method of the this embodiment. The above intensity numbers are merely exemplary, and other scales and ranges may be used with equal success with the present invention. Furthermore, other image parameters are compatible with the invention, such as for example texture, color, transparency, and polarization. Similarly, when applied to processing of audio sensory inputs, different frame parameters, such as frequency, pith, etc. are compatible as well with the present invention.

At next step, the reference sub-frame 414 and two displaced sub-frames 415, 515, are generated from the frame 400, as shown in FIGS. 4 and 5, respectively. The reference sub-frame 414 corresponds to the sub-frame position 412; the reference sub-frames 415, 515 correspond to the shifted sub-frame positions 413, 513, respectively. The sub-frame position 413 corresponds to shifting the sub-frame 412 horizontally (as depicted by the displacement vector 408), while the sub-frame 513 corresponds to shifting the sub-frame 412 vertically (as depicted by the displacement vector 508). The data content of the shifted sub-frames is shown in sub-frames 415, 515, respectively.

At next step, the temporal filter (such as the filter described by Eqn. 1 above) is applied to the sequence of sub-frames 414-415 and 514-515, in order to obtain the filtered sub-frames 416, 516, respectively. In the case of the vertical sub-frame displacement (such as in FIG. 4), the input sub-frames 414, 415, produce the difference image 416, containing a vertical feature 418. The displacement vector 408 is configured such that the width 420 of the feature 418 is optimally configured (matches the spatial filter main lobe width; for example, filter main lobe 302 or 322).

Similarly, in the case of the horizontal sub-frame displacement (such as in FIG. 5), the input sub-frames 414, 515, produce the difference image 516, containing a horizontal feature 518. The displacement vector 508 is configured such that the width 520 of the feature 518 is also optimally configured (matches the spatial filter main lobe width; for example, filter main lobe 302 or 322). In a more generalized case (not shown), when the input contains both horizontal and vertical edges, the movement direction emphasizes selected features. That is, a vertical movement emphasizes horizontal features, while suppressing vertical features. Conversely, the horizontal movement emphasizes vertical features while suppressing horizontal features. In general, the filter implementation as described above is configured to emphasize features with edges that are oriented at an angle relative to the movement direction, while suppressing features with edges that are parallel to the movement direction.

While features that are oriented perpendicular to the shift direction are emphasized the most in the exemplary embodiment, features at other orientations relative to the shift direction may be revealed with higher and higher spatial frequencies (possibly falling out of the passband of the spatiatemporal filter at some point). By way of example, for the same displacement, features (such as the edge 212 in FIG. 2) that are oriented at shallow angles relative to the shift direction produce enhanced versions (such as the bar 218) of smaller widths, and therefore higher spatial frequency, when compared to the features that are oriented perpendicularly to the shift direction.

In one embodiment, the frame movement follows a smooth trajectory, allowing temporal proximity for spatial features between frames. The temporal proximity is used to describe frame position change where a substantial portion of the frame area remains common between any two successive frames. For instance, the common area comprises at least one-third of the image frame. For an input image sequence presented as discrete frames, a particular spatial feature may be present for several subsequent frames, at different positions relative to the sensory processor apparatus.

In another embodiment, the image movement comprises sudden shifts that are characterized by an inter-frame displacement that is comparable to or smaller than the frame size. In one variant, such movements comprise retinal saccades, and are modeled via micro-saccades and big saccades (and combinations of different types of saccades). The micro-saccades may comprise fixational activity, in which the movements are small and remain centered about a particular image position, which is analogous to a radar antenna locking onto an identified target. Big saccades may be used to change the position of fixation to a new position on the input image (such as when changing lock targets) with saccades and microsaccades spanning a sensing field that is larger than the RGCs sample aperture. In another variant, the input image may be a sequence of frames in time, where a saccade may occur at any, or every, frame. Any eye movement in this case may be considered a saccade or micro-saccade, where the difference may be determined by the size of movement relative to the spatial extent of the spatiotemporal filters sampling the image. In yet another variant, the input frame comprises a video stream, or any input image sequence, where the input is varying over time. The saccades and micro-saccades occur independently of movement in the input over time.

Learning-Based Encoding Methods

In another aspect of the invention, learning-based encoding of sensory inputs is described. As described above with respect to FIGS. 1-6, input image frame is divided into tiles (sub-frames), and the spatiotemporal filters are used to produce the filtered sub-frames. Subsequently, the filtered sub-frames are encoded to produce a separate pulsed output for each tile. The encoded outputs is transmitted in the form of pulses (or their computerized representation) along the transmission channels 105 to downstream decoders (such as the decoders of the first decoder bank 106 in FIG. 1). The decoders within the decoder banks 106, 108 are configured to respond selectively to features in the image frame as represented by the pulsed outputs from the filters.

In one embodiment of the invention, the output pulses of the sensory processor utilize latency coding to transmit information, such as by using the techniques described in commonly owned and co-pending U.S. patent application Ser. No. 13/152,084 entitled APPARATUS AND METHODS FOR PULSE-CODE INVARIANT OBJECT RECOGNITION incorporated by reference, supra. In this disclosure, spatial features of the image are encoded and transmitted as patterns of relative pulse latencies. In one variant, the filters (or RGCs) that are positioned at different distances from an edge presented in the input image produce pulsed responses with the latencies that vary according to the distance from the edge. In another variant, the pulse latencies are determined using a logarithmic function of the spatiotemporal filter outputs.

In another embodiment, the transmission channel gain (or weight) is modified as a function of the filter output and decoder output pulses. For example, channel plasticity may be implemented as a function of the timing interval between the input pulse that is delivered to the decoder via the channel, and the output detection pulse that is generated by the decoder, as described in detail in a commonly owned and co-pending U.S. patent application Ser. No. 13/152,105 entitled APPARATUS AND METHODS FOR TEMPORALLY PROXIMATE OBJECT RECOGNITION incorporated by reference. supra.

In one variant, the Spike Timing Dependent Plasticity (STDP) method is used, such that the channel gain or weight is increased (potentiated) in response to the input pulse arriving prior to the detection pulse (a postsynaptic spike occurs after a pre-synaptic spike), and is decreased (depressed) when a pre-synaptic spike occurs after a postsynaptic spike), within predetermined time windows. Other temporal relationships between pre-synaptic and postsynaptic pulses (spikes) may also be used consistent with the invention. For instance, a reverse STDP method may be used, wherein a postsynaptic spike occurring after a pre-synaptic spike leads to depression (and the reverse leads to potentiation), or alternatively an STDP rule may be used, wherein both cases lead to potentiation or depression. In the exemplary implementation, the STDP window is selected not to exceed 50 milliseconds, although other values may readily be used. Application of the plasticity rule may allow for the formation of receptive fields for particular input features, represented by the pattern of input connection weights from spatiotemporal filters or RGCs to units or neurons.

In another embodiment, one or more decoders are configured to selectively respond to certain object features (such as horizontal or vertical bars, etc.). For a visual input, the features may consist of, but are not limited to: (i) orientations, (ii) differences in color or hue, (iii) patterns, and/or (iv) contours in the input image. These features may also relate inputs other than visual inputs, such as e.g., other forms of electromagnetic radiation, pressure, gravitational, and/or chemical inputs. This selective response may also driven by activity-dependent learning.

As an illustrative example, in one variant, a particular decoder establishes (through learning) strong connections with a particular subset of transmission channels. This channel subset enables the decoder to become more responsive to a certain object feature, in essence creating a specialized decoder. For example, such decoder may only receive significant input from four channels spatially arranged in a row, and the decoder therefore is maximally activated by a simultaneous pulse arrival from all four channels. In this case, the decoder comprises an edge decoder that has a certain optimal edge orientation that is aligned with the row of channels. That is, when representations of a number of edges with different orientations are present in the input pulse groups, the decoder output is the "strongest" for those edge inputs that match the decoder optimal orientation, and is the "weakest" for those edges whose orientations are the furthest away from the optimal orientation for that specific decoder. This decoder implementation is also referred to herein as the oriented edge decoder.

In another embodiment, the decoders are configured to adaptively adjust their selectivity to input features during operation. This adaptation (also referred to as "learning") is applied to a plurality of the decoders, thus creating a plurality of specialized decoders (for example, for edges of different orientations) in real time. In one variant, a cascade of specialized feature decoders is configured to give rise to decoders that are selective for more complicated features, such as contours and patterns. This learning or plasticity can be turned on or off, or its strength can be modulated as desired.

In yet another embodiment, the decoders are configured to select for the temporality or ordering of input signals as well as the spatial arrangement of signals. This is used for the detection of a particular direction of motion of an edge over the opposite direction of motion. In one variant, the encoder comprises multiple spatio-temporal filters configured to operate in a certain (optimal) band (or bands) of the electromagnetic spectrum. A combination of such filters gives rise to decoders that are optimally configured for a certain set of colors or hues so that the decoders are characterized as decoders of certain specific colors or hues. In another variant, such color-specific decoders are arranged spatially to detect colored edges.

In another embodiment, the sub-frame displacement is configured to match the spatial and temporal characteristics of the filters, thus enhancing certain spatial features (such as edges of a certain orientation) relative to other spatial features. In one variant, the pulsed output of the plurality of filters encodes object feature position and/or size. In another variant, the decoders selectively respond to differences in colors in localized regions or positions in the input image.

The aforementioned decoders may be configured to selectively respond to more complex object features as well, such as e.g., conjunctions of line segments, specific patterns (i.e., an 'A' shape) and/or texture (i.e. cross-hatching) in localized regions or positions in the input image.

Encoder Operation Methods

Figure 6:
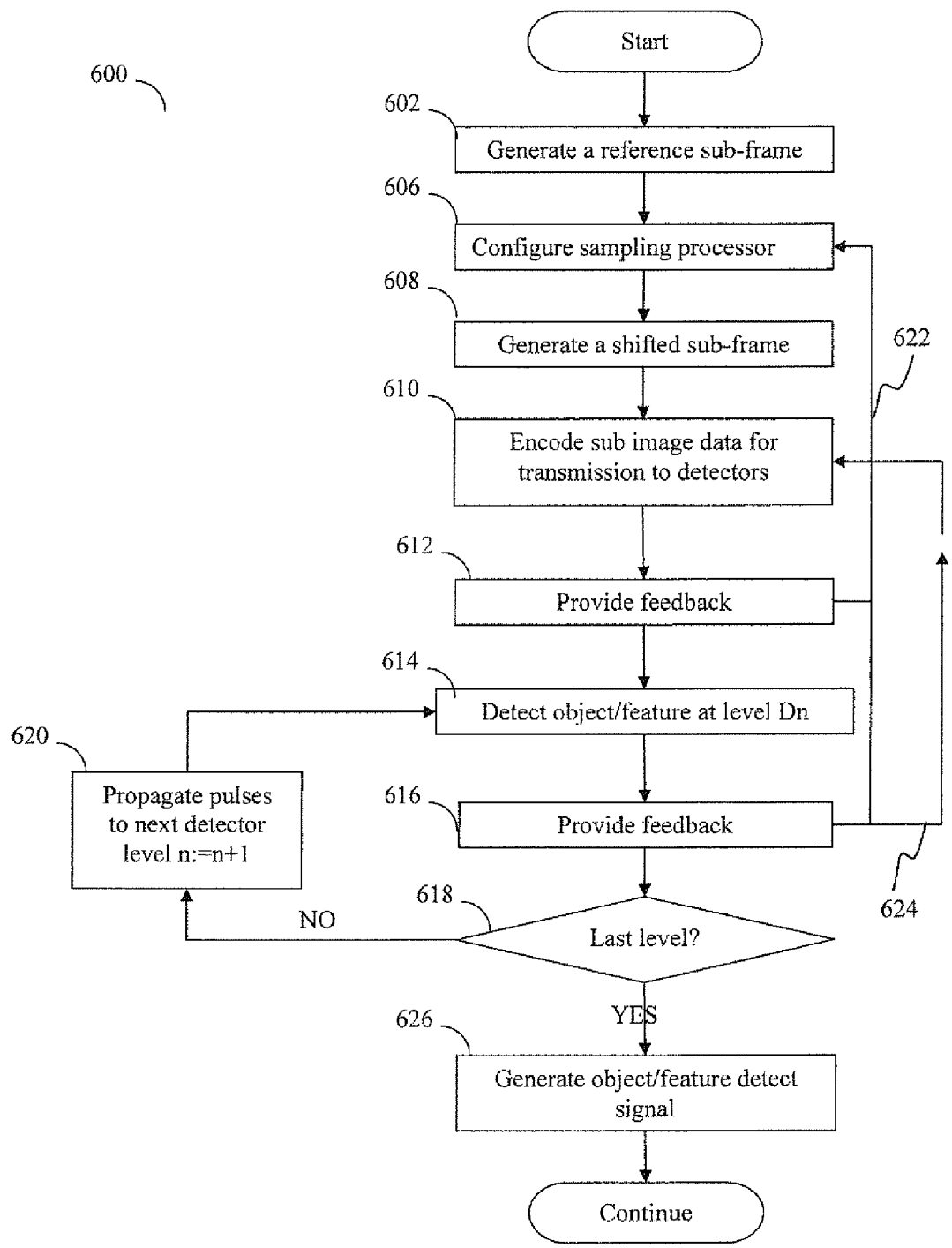
FIG. 6 is a logical flow chart illustrating one embodiment of image feature encoding and detection method according to the invention.

Referring now to FIG. 6, one exemplary embodiment of a method of encoder operation (useful with the encoder apparatus 100 described with respect to FIG. 1, supra) according to the invention is described. The method 600 of FIG. 6 advantageously allows for, inter alia, sub-frame encoding into pulse groups, and adaptive adjustment of encoding.

At step 602 of the method 600, the encoder apparatus receives a sensory input, and generates a reference sub-frame (such as the reference sub-frame discussed with respect to of FIG. 1 supra) comprising an object or a feature of interest. At step 606, the encoding apparatus configures parameters of the sampling processor (such as the processor 102 of FIG. 1). In one implementation of this step 602, the configuration parameters comprise: (i) the size of the sub-frame, (ii) the shift direction of the sub-frame, and (iii) the magnitude of the sub-frame.

At step 608, the encoder apparatus generates a shifted sub-frame (such as the sub-frame 103 of FIG. 1), and forwards both sub-frames to the encoder (e.g., the encoder 104 of FIG. 1). Other frame transfer implementations, such as described supra with respect to FIG. 1, may be used as well.

At step 610, the two generated sub-frames are encoded into pulse patterns. In one implementation of this step 610, the encoding is effected via a bank of spatio-temporal filters, which provides feedback to the sampling processor (step 612). The feedback comprises information related to generation of the shifted sub-frame, such as the frame size, shift magnitude, and direction.

The encoded pulse patterns are transmitted to a bank of first-level decoders, which performs object feature detection at step 614. Upon analyzing the detection results, the decoders at step 616 provide feedback to the sampling processor configuration step 606 via the pathway 622. In the implementation of FIG. 6, the decoders also provide feedback to the encoding step 610 via the pathway 624. As it is recognized by those skilled in the arts, both logical feedback pathways 622, 624 may be implemented in a single physical feedback network.

In one embodiment, the feedback information comprises decoder and/or channel state adjustment, such as e.g., those described in commonly owned U.S. patent application Ser. No. 13/152,084 entitled "APPARATUS AND METHODS FOR PULSE-CODE INVARIANT OBJECT RECOGNITION", incorporated herein by reference in its entirety. This exemplary approach uses pulse timing-dependent plasticity, wherein the response of decoders and/or transmission channels is dynamically adjusted based in part on prior decoder activity and/or a prior input. Transmission characteristics of different channels (for example, the conduction delay, or channel gain are adaptively adjusted based on prior input signals (history). In this fashion, the detection apparatus advantageously acquires, through learning and adaptation, invariant recognition properties initially not present.

In another variant, also described in detail in the above cited application, the decoder nodes are configured to interact with each other on comparatively short time scales. For example, a decoder that is the first to recognize the object of interest transmits an indication to neighboring decoders, the indication being used to prevent the other nodes from generating detection signals.

At step 618 of the method 600, it is determined if the last level within the decoder bank hierarchy has been reached and if not, the pulsed signals are transmitted to the next downstream bank of decoders, as described above with respect to FIG. 1.

When the last level of the decoder hierarchy is reached, a detection signal indicative of an object (or an object feature such as an edge, for example) is generated per step 626.

Exemplary Uses and applications of Certain Aspects of the Invention

A sensory input encoding apparatus configured to: (i) extract and analyze statistics of the sensory input, and (ii) adapt information encoding to the input signal statistics over predetermined time scales, as discussed above, offers a mechanism that enables learning, and produces an adaptive encoder (re)configuration that is optimal for the specific input signal. Such an approach offers substantial and distinct advantages over the prior art 'hard-coded' implementations that require a priori knowledge of the input signal statistics in order to produce an optimized encoder configuration. One such advantage is that when the input data statistics diverge from the initial assumptions, the encoding of the prior art techniques becomes sub-optimal, resulting in detection misses and false-positives. The encoding apparatus of the present invention suffers no such disabilities, as a change in the input statistics would cause the present invention to adapt to these new statistics over some time period relevant to the adaptation implementation.

The use of dynamically configurable encoder that adapts to the statistics of the input signal advantageously enables component reuse and produces a solution requiring fewer components (compared to the existing matched filter solutions), thereby lowering the overall complexity and cost of the sensory input processing system.

Moreover, in the present invention, image movements (i.e., saccadic movements) may be combined with learning in order to allow filters to be tuned to certain spatial frequencies and orientations over time, depending on the combination of saccadic movement parameters and input image statistics.

The foregoing descriptions of the invention are intended to be illustrative, and not in any way limiting; those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above. These improvements advantageously translate into a system that requires fewer decoders and fewer processing units, compared to the prior art, and that allows taking advantage of the combinatorial richness of the pulse code.

Advantageously, exemplary embodiments of the present invention are useful in a variety of devices including without limitation prosthetic devices (such as retinal implants), autonomous and robotic apparatus, and other electromechanical devices requiring object recognition functionality. Examples of such robotic devises are manufacturing robots (e.g., automotive), military devices, and medical devices (e.g. for the processing of microscopy, x-ray, ultrasonography, tomography, etc. information). Examples of autonomous vehicles include rovers, unmanned air vehicles, underwater vehicles, smart appliances (e.g. ROOMB⁴®), etc.

Embodiments of the present invention are further applicable to a wide assortment of applications including computer-human interaction (e.g., recognition of gestures, voice, posture, face, etc), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others including processing of structured inputs of other sensory modalities, i.e. auditory, somatosensation, olfaction, etc.

Advantageously, the present invention can be used to simplify tasks related to motion estimation, such as where an image sequence is processed to produce an estimate of the object position (and hence velocity) either at each points in the image or in the 3D scene, or even of the camera that produces the images. Examples of such tasks are: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another approach, portions of the object recognition system are embodied in a remote server configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed:

1. A sensory input processing apparatus, comprising:
   a receiver configured to receive an input data frame comprising a feature;
   a sampler operably coupled to the receiver and configured to generate a sequence of sub-frames comprising a first sub-frame and a second sub-frame, at least one of the first sub-frame and the second sub-frame comprising at least a portion of the feature;
   an encoder operably coupled to the sampler and configured to receive and encode the first sub-frame and the second sub-frame into a group of pulses; and
   a first decoder coupled by a plurality of transmission channels to the encoder and configured to receive said group of pulses and to generate a detection signal;

wherein:
a displacement of the second sub-frame relative to the first sub-frame is configured to effect detection of the feature; and
at least a portion of the plurality of transmission channels is configurable to be adjusted from a first scheme to a second scheme based at least in part on the detection signal.

2. The apparatus of claim 1, wherein the first scheme comprises a first gain and the second scheme comprises a second gain, the second gain configured to be substantially larger compared to the first gain responsive to the detection signal being generated.

3. The apparatus of claim 1, wherein at least one of the plurality of transmission channels is configurable to be adjusted from a third scheme to a fourth scheme responsive to arrival of at least one pulse of said group of pulses at the first decoder via the at least one of the plurality of transmission channels within a first time interval relative to the detection signal.

4. The apparatus of claim 3, wherein the third scheme comprises a third gain and the fourth scheme comprises a fourth gain, the fourth gain configured to be substantially larger compared to the third gain responsive to the at least one pulse arrival prior to the detection signal.

5. The apparatus of claim 1, wherein information related to the feature is encoded into a pattern of latencies of the group of pulses relative to one another; and
the pattern of latencies is insensitive to one or more of luminance and/or contrast of the feature.

6. The apparatus of claim 1, wherein the encoder is effected by a bank of spatio-temporal filters configured to generate a time-filtered sub-frame based at least in part on a comparison of a first pixel of the first sub-frame to a second pixel of the second sub-frame.

7. The apparatus of claim 6, wherein:
the time-filtered sub-frame comprises a difference between pixels of the second sub-frame and pixels of the first sub-frame, and is configured to enhance detection of the feature compared to that of the first sub-frame and the second sub-frame; and
the time-filtered sub-frame is encoded into a pattern of latencies of the group of pulses relative to one another.

8. The apparatus of claim 6, wherein:
information related to the feature is encoded into a pattern of latencies of the group of pulses relative to one another; and
the encoder is adapted to apply a logarithmic function to an output of each filter of the bank of spatio-temporal filters to configure pulse latencies within the pattern of latencies.

9. The apparatus of claim 6, wherein the displacement is configured based at least in part on a spatial parameter of at least a sub-set of said bank of spatio-temporal filters.

10. The apparatus of claim 1, wherein the displacement is selected based at least in part on a feedback signal received from the first decoder, the feedback signal being generated based at least in part on reception of said group of pulses.

11. An apparatus configured for processing of sensory input, the apparatus comprising:
a receiver configured to receive an input data frame;
a sampler operably coupled to the receiver and configured to generate a first sequence of sub-frames comprising a first sub-frame and a second sub-frame, at least one of the first sub-frame and the second sub-frame comprising at least a portion of the input data frame;
an encoder operably coupled to the sampler and configured to:
receive and encode the first sub-frame and the second sub-frame into a group of pulses; and
transmit said group of pulses via a plurality of transmission channels to at least one decoder; and
where at least the portion of the input data frame comprises a feature;
the at least one decoder is configured to detect the feature via a displacement of the second sub-frame relative to the first sub-frame; and
where information related to at least the portion of the feature is encoded into a pattern of latencies of the group of pulses relative to one another.

12. The apparatus of claim 11, wherein
the feature comprises an edge;
the displacement is characterized by a first distance and a first direction and is configured to:
enhance edge detection when the edge is in a first orientation relative to the first direction; and
suppress edge detection when the edge is in a second orientation relative to the first direction.

13. The apparatus of claim 11, wherein the displacement is selected so as to enhance detection of the feature based at least in part on at least the portion of the feature having a first color, the first color being substantially different from a background color of the input data frame, the background color not being a part of at least the portion of the feature.

14. The apparatus of claim 11, wherein the displacement is configured to enhance detection of the at least the portion of the feature based at least in part on at least the portion of the feature having a first pattern, the first pattern being substantially different than a background pattern of the input data frame, the background pattern not being a part of at least the portion of the feature.

15. The apparatus of claim 11, wherein:
the encoded information is generated by a plurality of spatiotemporal filters configured to generate a third sub-frame based at least in part on a comparison of a first pixel of the first sub-frame to a second pixel of the second sub-frame; and
the third sub-frame is encoded into said pattern of latencies.

16. The apparatus of claim 15, wherein the third sub-frame increases a likelihood related to detection of the feature as compared to a detection that is based on the first sub-frame or on the second sub-frame being encoded individually.

17. The apparatus of claim 11, wherein the displacement is configured based at least in part on a spatial parameter of at least a sub-set of a plurality of spatiotemporal filters, the plurality of filters configured to generate a third sub-frame based at least in part on a comparison of a first pixel of the first sub-frame to a second pixel of the second sub-frame.

18. A processing apparatus, comprising:
a sampler configured to receive an input data frame and to generate a sequence of sub-frames comprising a first sub-frame and a second sub-frame, at least one of the first sub-frame and the second sub-frame comprising at least a portion of a feature;
an encoder operably coupled to the sampler and configured to receive and to encode the first sub-frame and the second sub-frame into a group of pulses; and
a first decoder configured to generate a detection signal responsive at least in part to reception of said group of pulses; and
where at least a portion of the input data frame comprises the feature;

the first decoder is configured to detect the feature via a displacement of the second sub-frame relative to the first sub-frame; and where information related to at least the portion of the feature is encoded into a pattern of latencies of the group of pulses relative to one another.

19. The apparatus of claim 18, further comprising a second decoder configured to receive said group of pulses from the encoder and a feedback signal from the first decoder, wherein the feedback signal is configured to inhibit the second decoder from the generation of a second detection signal responsive to reception of said group of pulses.

20. The apparatus of claim 18, wherein:

the encoder is effected by a bank of spatio-temporal filters configured to generate a third sub-frame based at least in part on a comparison of a first pixel of the first sub-frame to a second pixel of the second sub-frame; and the decoder is configurable to be adjusted from a first regime to a second regime based at least in part on the detection signal.

21. The apparatus of claim 18, wherein the first decoder is further configurable to be adjusted from a third regime a fourth regime based at least in part on a second detection signal, the second detection signal being generated responsive to a second sequence of sub-frames, the second sequence of sub-frames temporally preceding the sequence of sub-frames.

* * * * *